US008738158B2

(12) United States Patent
Sims et al.

(10) Patent No.: US 8,738,158 B2
(45) Date of Patent: May 27, 2014

(54) APPARATUS AND METHOD FOR REMOTE CONFIGURATION OF COMMON OBJECTS ACROSS LIGHTING CONTROLLERS

(75) Inventors: William F. Sims, Murfreesboro, TN (US); Jason Lien, Murfreesboro, TN (US); Edwin Moore, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 509 days.

(21) Appl. No.: 12/711,477

(22) Filed: Feb. 24, 2010

(65) Prior Publication Data

US 2011/0204824 A1 Aug. 25, 2011

(51) Int. Cl.

*G05B 11/01* (2006.01)
*G06F 19/00* (2011.01)
*G06F 17/00* (2006.01)

(52) U.S. Cl.

USPC ................... 700/20; 700/3; 700/28; 700/108; 715/235

(58) Field of Classification Search

USPC ........................... 700/3, 20, 28, 108; 715/235
See application file for complete search history.

(56) References Cited

U.S. PATENT DOCUMENTS 4,486,832 A * 12/1984 Haubner et al. .............. 713/401
4,660,141 A * 4/1987 Ceccon et al. .................... 710/9
4,837,665 A * 6/1989 Hoyer et al. .................... 362/96
5,059,871 A * 10/1991 Pearlman et al. ............. 315/316
5,287,548 A * 2/1994 Flood et al. ..................... 700/18
5,317,646 A * 5/1994 Sang et al. .................... 382/175
5,444,851 A * 8/1995 Woest .......................... 709/222
5,463,735 A * 10/1995 Pascucci et al. .............. 709/222
5,724,509 A * 3/1998 Starkweather et al. ....... 709/220
6,093,215 A * 7/2000 Buxton et al. ................ 717/107
6,151,608 A * 11/2000 Abrams ........................ 707/679
6,295,541 B1 9/2001 Bodnar et al.
6,487,680 B1 * 11/2002 Skazinski et al. ............... 714/23
7,114,154 B1 * 9/2006 Crohn ........................... 718/100
7,139,617 B1 * 11/2006 Morgan et al. .................. 700/17
7,209,838 B1 * 4/2007 Wright et al. ................... 702/60
7,221,110 B2 * 5/2007 Sears et al. .................... 315/312
7,369,060 B2 5/2008 Veskovic et al.
7,411,489 B1 8/2008 Elwell et al.
7,451,001 B2 * 11/2008 Harwood .......................... 700/1
7,550,931 B2 * 6/2009 Lys et al. ...................... 315/291
7,730,223 B1 * 6/2010 Bavor et al. ........................ 710/8
7,809,448 B2 * 10/2010 Lys et al. ........................ 700/12
2003/0084139 A1 * 5/2003 Huddleston et al. .......... 709/223
2004/0124338 A1 * 7/2004 Cloutier et al. ........... 250/214 C
2005/0275626 A1 * 12/2005 Mueller et al. ................ 345/156
2006/0001683 A1 * 1/2006 May et al. ..................... 345/661
2006/0044152 A1 * 3/2006 Wang ............................ 340/825
2006/0125426 A1 6/2006 Veskovic et al.
2006/0132065 A1 * 6/2006 Sears et al. .................... 315/312
2006/0168557 A1 * 7/2006 Agrawal et al. ............... 717/104
2007/0018795 A1 * 1/2007 Harwood ................. 340/286.02
2007/0273307 A1 11/2007 Westrick et al.

(Continued)

*Primary Examiner* — Kavita Padmanabhan
*Assistant Examiner* — Thomas Stevens
(74) *Attorney, Agent, or Firm* — Lando & Anastasi, LLP

(57) ABSTRACT

A lighting system controller is provided that is adapted to configure a plurality of lighting controllers using a set of common configuration information referred to as a template. According to one example, the lighting system controller is configured to maintain a set of templates and to track associations between templates and elements of a lighting control system that are managed by the lighting system controller. Examples of managed elements include lighting controllers and configurable objects resident within the lighting controllers.

20 Claims, 8 Drawing Sheets

(56) References Cited

U.S. PATENT DOCUMENTS

| | | | | |
|---|---|---|---|---|
| 2007/0291483 | A1 * | 12/2007 | Lys | 362/227 |
| 2008/0092075 | A1 | 4/2008 | Jacob et al. | |
| 2008/0180270 | A1 | 7/2008 | Veskovic et al. | |
| 2008/0185977 | A1 | 8/2008 | Veskovic et al. | |
| 2008/0263150 | A1 | 10/2008 | Childers et al. | |
| 2009/0184840 | A1 | 7/2009 | Veskovic et al. | |
| 2011/0138263 | A1 * | 6/2011 | Sims et al. | 714/819 |
| 2011/0169413 | A1 * | 7/2011 | Wendt et al. | 315/152 |

* cited by examiner

APPARATUS AND METHOD FOR REMOTE CONFIGURATION OF COMMON OBJECTS ACROSS LIGHTING CONTROLLERS

BACKGROUND

1. Field of the Invention

At least one aspect in accord with the present invention relates generally to apparatus and processes for controlling illumination of lights, and more specifically, to apparatus and processes for remotely configuring information stored within lighting controllers.

2. Discussion of Related Art

Lighting is the one of the largest consumers of electric power in a typical building, often exceeding 30% of the total energy cost. To better manage the energy costs associated with lighting, lighting control systems are typically used. Lighting control systems are designed to manage energy consumption while providing light, where and when it is needed. Conventional lighting control systems include lighting controllers that are capable of activating and deactivating remotely operated circuit breakers or switches according to a predefined schedule. For example, lighting control systems often adjust lighting in a building according to occupancy schedules associated with the various areas of the building, which are often partitioned into lighting zones. By controlling lights according to these schedules, lighting control systems can, in some installations, reduce energy costs associated with lighting by over 50%. Lighting control systems may also be used with occupancy sensors to control building lighting based on actual occupancy of areas of the building.

Lighting control systems provide additional benefits. For example, lighting control systems can increase the longevity of lamps and ballasts by reducing the number of burn hours incurred over a period of time. In addition, lighting control systems can be used to comply with many building code requirements.

SUMMARY OF THE INVENTION

Aspects in accord with the present invention demonstrate an appreciation that the administrative burden associated with lighting control systems is significant. For example, lighting control systems typically require individual configuration of each lighting controller that is managed by the lighting control system. To help ease this burden, various examples provide for innovative approaches to configure elements of a lighting control system. Lighting control system elements that are configured using the various examples disclosed herein are referred to as "managed elements." Examples of managed elements include lighting controllers and configurable objects and elements resident within the lighting controllers, which are discussed in greater detail below.

According to various examples, a lighting control system includes a lighting system controller that is adapted to configure information that can be used to control the operational behavior of multiple lighting controllers. In these examples, the lighting system controller is configured to provide an interface that allows an external entity, such as a user or external system, to create one or more templates. A template may include configuration information that can control the operational behavior of one or more lighting controllers. In addition, according to some examples, the lighting system controller is configured to provide an interface that allows an external entity to associate one or more templates with one or more managed elements. Also, in these examples, the lighting system controller is configured to distribute the configuration information included in the one or more templates to the one or more managed elements, such as one or more lighting controllers.

According to one example, a method for managing a configuration of a plurality of lighting controllers is provided. The method includes acts of creating a template including configuration information applicable to operational parameters of each of the plurality of lighting controllers, associating the template with the plurality of lighting controllers and providing the template to each of the plurality of lighting controllers, whereby causing each of the plurality of lighting controllers to apply the configuration information included in the template.

In the method, the act of creating the template may include an act of receiving configuration information applicable to at least one of an external device input, a zone, a schedule, a clock, an alarm, a control bus and a remote circuit breaker. In addition, the act of associating the template may include an act of associating the template with a plurality of configuration elements stored in the plurality of lighting controllers, each of the plurality of configuration elements being stored on a different lighting controller of the plurality of lighting controllers. Further, the act of associating the template may include an act of associating the template with a plurality of objects stored in the plurality of lighting controllers, each of the plurality of objects being stored on a different lighting controller of the plurality of lighting controllers. Moreover, the act of associating the template with the plurality of objects stored in the plurality of lighting controllers may include an act of associating the template with a plurality of objects having a common class. Additionally, some of the plurality of objects may have a sequence of instances, each sequence having a number of member instances, each member instance of each sequence having a relative position within each sequence and the act of associating the template may include an act of associating the template with a member instance of each sequence, at least two of the associated member instances having different relative positions.

The method may include an act of receiving a request to create the template from an external entity. In addition, the method may include an act of receiving, from each of the plurality of lighting controllers, a deployment result indicating whether the lighting controller sending the deployment result successful applied the template to the operational parameters of the lighting controller. Further, the method may include an act of providing the template to a lighting controller in response to receiving an unsuccessful deployment result from the lighting controller.

According to another example, a lighting system controller is provided that includes a network interface, a memory and a controller coupled to the network interface and the memory. The controller is configured to create a template including configuration information applicable to operational parameters of each of the plurality of lighting controllers, associate the template with the plurality of lighting controllers and provide the template to each of the plurality of lighting controllers, whereby causing each of the plurality of lighting controllers to apply the configuration information included in the template.

In the lighting system controller, the controller configured to create a template may be further configured to receiving configuration information applicable to at least one of an external device input, a zone, a schedule, a clock, an alarm, a control bus and a remote circuit breaker. In addition, the controller configured to associate the template may be further configured to associate the template with a plurality of configuration elements stored in the plurality of lighting controllers, each of the plurality of configuration elements being stored on a different lighting controller of the plurality of lighting controllers. Further, the controller configured to associate the template may be further configured to associate the template with a plurality of objects stored in the plurality of lighting controllers, each of the plurality of objects being stored on a different lighting controller of the plurality of lighting controllers. Moreover, each of the plurality of objects may be based on a common class. Additionally, some of the plurality of objects may have a sequence of instances, each sequence having a number of member instances, each member instance of each sequence having a relative position within each sequence and the controller configured to associate the template may be further configured to associate the template with a member instance of each sequence, at least two of the associated member instances having different relative positions.

In the lighting system controller, the controller may be further configured to receive a request to create the template from an external entity. In addition, the external entity may be at least one of a user and an external system. Further, the controller may be further configured to receive, from each of the plurality of lighting controllers, a deployment result indicating whether the lighting controller sending the deployment result successful applied the template to the operational parameters of the lighting controller. Further, the controller may be further configured to provide the template to a lighting controller in response to receiving an unsuccessful deployment result from the lighting controller.

According to another example, a lighting system controller is provided that includes a network interface, a memory and a mechanism for configuring a plurality of lighting controllers using a template including configuration information applicable to the operational parameters of each of the plurality of lighting controllers.

Still other aspects, examples, and advantages of these exemplary aspects and examples, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
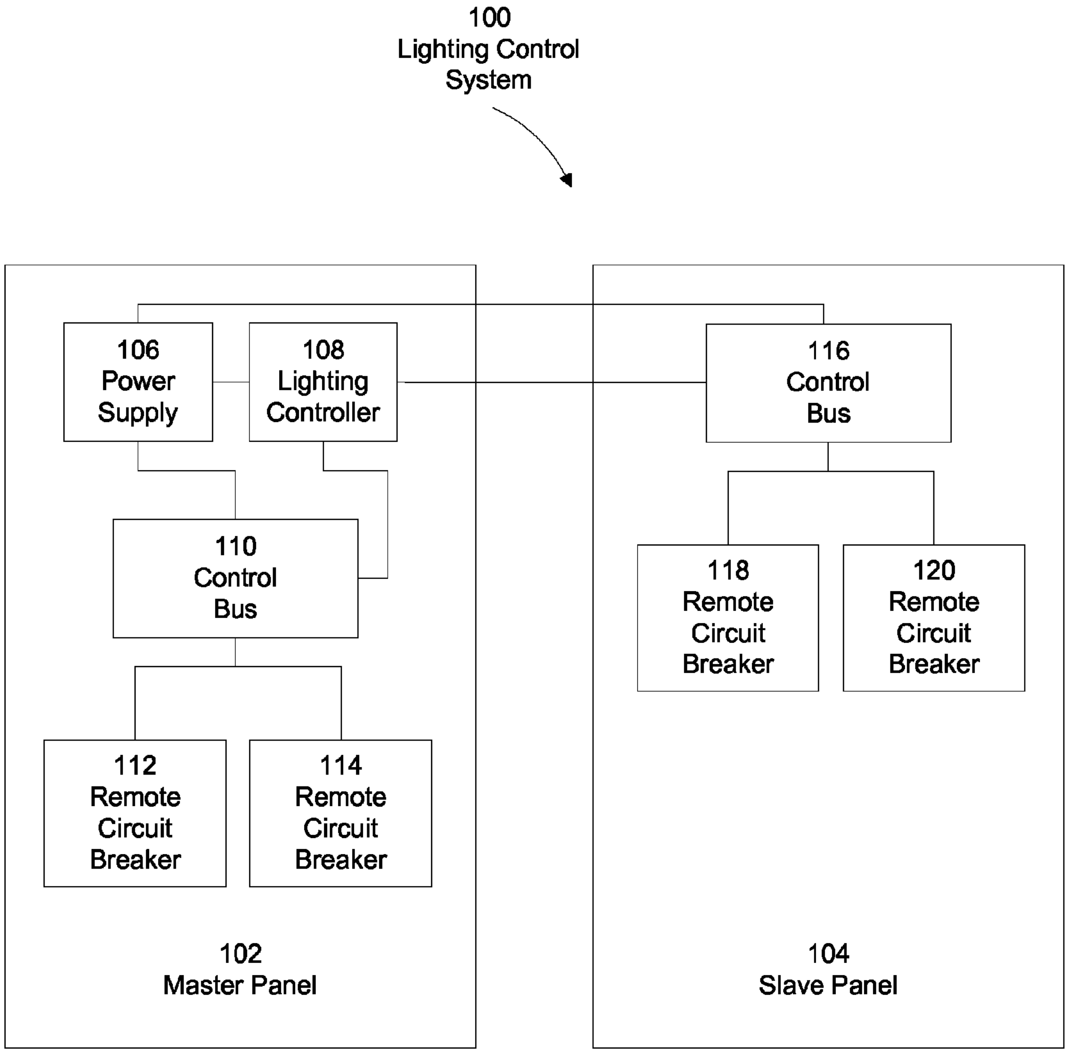
FIG. 1 is a block diagram of an example of a lighting control system.

At least some aspects and examples relate to apparatus and processes that allow lighting control system administrators to easily configure and maintain lighting control systems and their constituent lighting controllers. For instance, in some examples a lighting control system includes a lighting system controller that can receive configuration information from an external entity and store the configuration information in one or more templates. In these examples, the lighting system controller can record an association between one or more templates and one or more lighting controllers that are managed by the lighting system controller. More particularly, in at least one example discussed further below, the lighting system controller can store configuration information used by one or more lighting controllers within a template. In other examples, the lighting system controller can distribute the configuration information included in these templates to lighting controllers through a network interconnecting the lighting system controller and the lighting controllers. In these examples, the distribution of the configuration information can be performed immediately or scheduled for a future time.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the apparatus and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing,"

"involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present apparatus and methods or their components to any one positional or spatial orientation.

Lighting Control Systems

The lighting control systems disclosed herein provide a variety of features that allow for precise control of lighting and other controlled loads. In some examples, lighting control systems includes external device inputs that can interface with external devices such as external time clocks, access readers, photocell controls, occupancy sensors and other building automation or security systems to exchange (i.e. receive or provide) information pertaining to the power control activities of the lighting control system. In at least one such example, the lighting control system is configured to activate or deactivate lights upon receipt of a notification (such as a dry-contact closure or a digital serial communication) from an external control device (such as a time clock). In other examples, the lighting control system includes a time clock and scheduler and may be configured to perform power control functions according to a default schedule and to adjust these power control functions to account for special events, daylight saving time and sunrise and sunset times for particular geographic locations. One example of a lighting control system 100 that may be configured to include these features is illustrated in FIG. 1.

As shown, the lighting control system 100 includes a master panel 102 and a slave panel 104. The master panel 102 includes a power supply 106, a lighting controller 108, a control bus 110 and remote circuit breakers 112 and 114. The slave panel 104 includes a control bus 116 and remote circuit breakers 118 and 120. In the arrangement shown, the master panel 102 controls the power supplied to various controlled loads (such as lights) via itself and the slave panel 104.

More particularly, in the example of FIG. 1, the power supply 106 provides operating power to the lighting controller 108 and the control busses 110 and 116. In addition, the lighting controller 108 includes facilities configured to control the operation of the remote circuit breakers 112, 114, 118 and 120 via the control busses 110 and 116. As shown, the lighting controller 108 transmits control signals to the control busses 110 and 116. These control signals may be transmitted via data cable (such as 4-wire, Class 1 communications cable).

Continuing this example, the control busses 110 and 116 receive operating power from the power supply 106 and control signals from the lighting controller 108. The control busses 110 and 116, in turn, further distribute the control signals (for example, via switching signals) and operating power to the remote circuit breakers 112, 114, 118 and 120. The remote circuit breakers 112, 114, 118 and 120 receive the operating power and the control signals from the control busses 110 and 116 and control the flow of power used by the controlled loads according to the control signals. In some examples, the remote circuit breakers 112, 114, 118 and 120 control the flow of power used by the controlled loads by completing or breaking a circuit including the controlled load and the source of power to the controlled load. In these examples, the source of power to the controlled load is the main power feed for the facility in which the lighting control system is installed, such as a utility power feed. Thus, the lighting control system 100 provides for centralized control of controlled loads by the lighting controller 108.

The components depicted in FIG. 1 may be selected from many suitable lighting control system components known in the art. In one example, the power supply 106, the lighting controller 108, the control busses 110 and 116 and the remote circuit breakers 112, 114, 118 and 120 are Square D® Powerlink® brand lighting control system components available from Schneider Electric. However, other examples may use other components and examples are not limited to a particular component or component manufacturer.

Lighting System Controller

Figure 2:
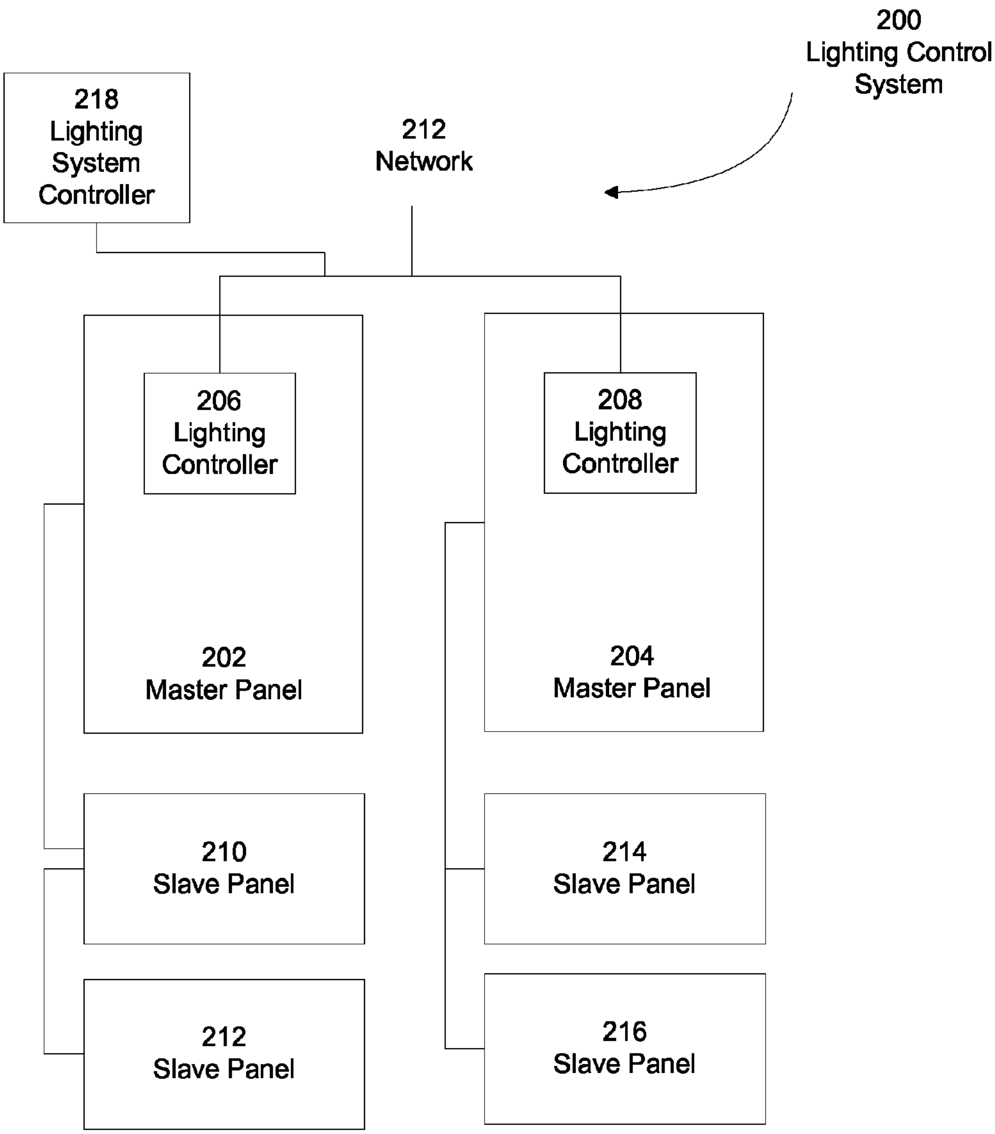
FIG. 2 is a block diagram of another example of a lighting control system.

FIG. 2 illustrates a more sophisticated lighting control system 200 that includes a lighting system controller 218, a network 212, master panels 202 and 204 and slave panels 210, 212, 214 and 216. The lighting control system 200 is one example of a system that is specially configured to perform the functions disclosed herein. However, the system structure and content discussed herein with regard to FIG. 2 are for exemplary purposes only and are not intended to limit other examples to the specific structure shown in FIG. 2. As will be apparent to one of ordinary skill in the art, many variant system structures can be architected without deviating from the substance of the examples disclosed herein. As shown, the master panels 202 and 204 respectively include lighting controllers 206 and 208. The remaining details of the master panels 202 and 204 and the slave panels 210, 212, 214 and 216 are not shown, but these panels are arranged, and function, in the manner discussed above regarding master panel 102 and slave panel 104.

According to this example, the lighting system controller 218 is coupled to the lighting controllers 206 and 208 by the network 212. The network 212 may include any communication network through which lighting control system components may exchange data. Particular examples of networking standards that the network 212 may support include communication protocols such as C-BUS™ and TCP/IP over Ethernet and serial protocols, such as Modbus® ASCII/RTU, DMX512 and JCI-N2. In various examples, the light system controller 218 exchanges a variety of information with the lighting controllers 206 and 208 using the network 212. In some examples discussed further below, the information exchanged includes power monitoring and configuration information, among other information.

In the example shown, the lighting system controller 218 includes elements configured to exchange and store a variety of information with the lighting controllers 206 and 208 or with external entities. Examples of the types of information that may be so exchanged include monitoring information, control information, diagnostic information, maintenance information and configuration information. The monitoring information may include detailed circuit breaker, zone, external device input, schedule and remote source information for each panel, such as the panel name and layout, circuit breaker names and numbers, and the current status of the circuit breaker (for example, ON, OFF or tripped). The control information may include information to activate or deactivate command zone overrides and external device inputs. The diagnostics information may include a panel summary that displays the panel address, control bus names, numbers, firmware versions and current operating states. In addition the diagnostic information may include a lighting controller summary that includes model number, firmware version, time clock information, communications status and information regarding the current operating environment. The maintenance information may include product support and technical support contact information. The configuration information, which is discussed in more detail below, may include any information used by the lighting system controller 218 to configure itself, or configuration information associated with managed lighting controllers, such as lighting controllers 206 and 208.

Figure 3:
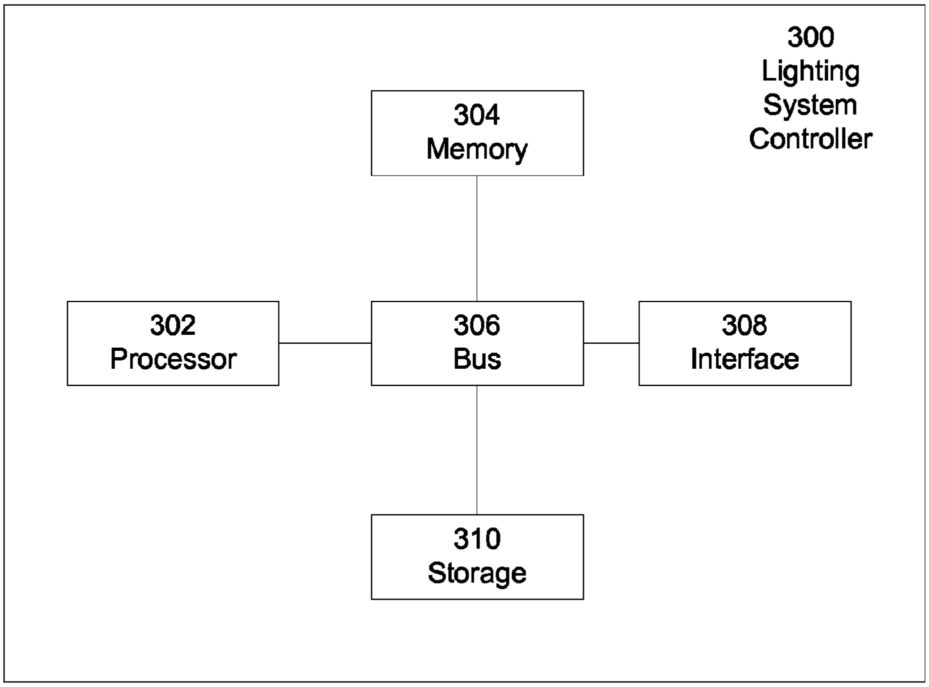
FIG. 3 is a block diagram of an exemplary lighting system controller.

FIG. 3 shows a more detailed example of a lighting system controller 300. As shown, the lighting system controller 300 includes hardware and software specially configured to perform the various aspects and functions described herein. In this example, the lighting system controller 300 includes a processor 302, a memory 304, a bus 306, an interface 308 and a storage 310. The processor 302 can perform a series of instructions that result in manipulated data. The processor 302 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 302 is connected to other system elements, including one or more memory devices 304, by the bus 306.

The memory 304 may be used for storing programs and data used during operation of the lighting system controller 300. The memory 304 may include any volatile or non-volatile storage device, such as a dynamic random access memory or a disk drive or combinations of these devices. Various examples may organize the memory 304 into particularized and, in some cases, unique structures to perform the functions disclosed herein.

Components of the lighting system controller 300 may be coupled by an interconnection element such as the bus 306. The bus 306 may include one or more physical busses, for example, busses between components that are integrated within a same machine, but may include any communication coupling between system elements including specialized or standard computing bus technologies such as IDE, SCSI, PCI and InfiniBand. Thus, the bus 306 enables communications, for example, data and instructions, to be exchanged between system components of the lighting system controller 300.

The lighting system controller 300 also includes one or more interfaces 308 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, serial ports, etc. In at least one example, the lighting system controller 300 includes an RS-485 port, an RS-232 port and an Ethernet card. Interface devices allow the lighting system controller 300 to exchange information and communicate with external entities, such as users and other systems.

The storage system 310 may include a computer readable and writeable nonvolatile data storage medium in which instructions are stored that define a program that may be executed by the processor 302. The storage system 310 also may include information that is recorded, on or in, the medium, and this information may be processed by the processor 302 during execution of the program. More specifically, the information may be stored in one or more data structures specifically configured to conserve storage space or increase data exchange performance. The instructions may be persistently stored as encoded signals, and the instructions may cause the processor 302 to perform any of the functions described herein. The medium may, for example, be optical disk, magnetic disk or flash memory, among others. In operation, the processor 302 or some other controller may cause data to be read from the nonvolatile recording medium into another memory, such as the memory 304, that allows for faster access to the information by the processor 302 than does the storage medium included in the storage system 310. The memory may be located in the storage system 310 or in the memory 304, however, the processor 302 may manipulate the data within the memory 304, and then copy the data to the medium associated with the storage system 310 after processing is completed. A variety of components may manage data movement between the medium and integrated circuit memory element and examples is not limited thereto. Further, examples are not limited to a particular memory system or storage system.

Although the lighting system controller 300 is shown by way of example as one type of system upon which various aspects and functions may be practiced, aspects are not limited to being implemented on the lighting system controller 300 as shown in FIG. 3. Various aspects and functions may be practiced on one or more lighting system controllers having different architectures or components than those shown in FIG. 3. For instance, the lighting system controller 300 may include specially programmed, special-purpose hardware, such as for example, an application-specific integrated circuit (ASIC) tailored to perform a particular operation disclosed herein.

The lighting system controller 300 may include an operating system that manages at least a portion of the hardware elements included in the lighting system controller 300. Usually, a processor or controller, such as the processor 302, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor 302 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform their described functions.

As discussed above with regard to FIG. 2, a lighting system controller, such as lighting system controller 300, can exchange configuration information with lighting controllers and external entities. Configuration information may include any information used to affect the operational behavior of a lighting system controller or a lighting controller. In some examples, the lighting system controller 300 can store configuration information in a variety of data structures, such as objects, that represent managed elements. These objects may be based on, and inherit attributes from, one or more classes. In addition, these objects may be instantiated multiple times to produce multiple instances of the same object. In some examples, each individual instance of an object may include an identifier, such as a sequence number that identifies the ordinal position of the instance within a set of instances. An example lighting control system with multiple instances of the same object is discussed further below with regard to FIG. 8. In other examples, the lighting system controller 300 can store elements of configuration information in name-value pairs. In at least one example, that data structures holding configuration information are organized and stored within the memory 304 or the storage 310.

Examples of types of managed elements that may be represented by objects include external device inputs, zones, schedules, clocks, alarms, control busses, remote circuit breakers, lighting controllers and lighting system controllers. Each of these objects has a variety of properties that may be configured and may include other, nested objects. For instance, in one example, an object that represents lighting controllers (i.e. a lighting controller object) includes other configurable objects representing communication protocols used by the lighting controller, identification information for the lighting controller and email configuration information for the lighting controller. Further, continuing this example, the lighting controller object may have multiple instances of any given nested object, such as multiple schedule objects, that represent multiple schedules that can be configured and managed by the lighting system controller. As is discussed further below, objects and other configuration information may be used to update the operational parameters of managed lighting controllers.

In some examples, the lighting system controller 218 includes elements configured to store specialized objects referred to as "templates." Templates may include configuration information that can be used to control the operational parameters of multiple lighting controllers. According to some examples, a template is a grouping of configuration information. Consequently, in some of these examples, templates correspond directly with one or more objects that represent managed elements, as discussed above. In other examples, templates contain configuration information that does not map directly to other objects. For instance, according to at least one example, one template includes configuration information sufficient to configure one or more schedule objects, another template includes configuration information applicable to alarms, schedules and zones and a third template includes a portion of the configuration information needed to configure a lighting controller object. Thus, a template may include sufficient configuration information to fully configure a lighting controller or may include only a portion of the configuration information needed to fully configure a lighting controller (or other managed element).

According to other examples, a template includes, in addition to the configuration information, a set of instructions that enable lighting controllers to apply the configuration information to one or more operational parameters. These instructions may cause the lighting controller to perform one or more data manipulation operations on the configuration management information when applying the configuration management information to its operational parameters. For instance, according to one example, a template may include instructions that cause the lighting controller to map particular elements of configuration management information to particular operational parameters and thereby cause the values stored in template for those elements to be assigned to the corresponding operational parameters. Thus, some examples provide for self-deploying templates.

According to various examples, the lighting system controller 218 has elements adapted to store associations between templates and managed elements. For instance, in some examples, the lighting system controller 218 can store associations between templates and managed lighting controllers, such as the lighting controllers 206 and 208. In these examples, the lighting system controller 218 can also store associations between templates and managed elements that are included within the lighting controllers 206 and 208, such as schedules and zones. In at least one example, the lighting system controller 218 stores these associations by recording (in local storage) a mapping between templates and objects (or instances of objects) that represent managed elements, such as lighting controller objects and objects that are nested within lighting controller objects, e.g. schedule objects, zone objects, alarm objects, etc.

In some examples, the lighting system controller 218 includes elements configured to provide one or more template management interfaces. In these examples, template management interfaces can be executed to create, modify, store and delete templates. According to these examples, the template management interfaces can receive identifiers of templates that are targeted for deletion or modification. In some of these examples, these template management interfaces can receive (from an external entity) indications of the type of configuration information that will be stored in the template (for example, when creating or modifying a template). These indications may reference individual elements of configuration information or may reference a set of elements of configuration information that corresponds to an object.

For instance, according to these examples, a user may create a template and indicate that the template is designed to hold configuration information for schedule objects by associating, via a user interface, the schedule object class with the template. Similarly, in another example, a user may modify a template and designate that the template should be configured to store configuration information for a lighting controller (and potentially all of the managed elements included in the lighting controller) by associating the lighting controller object class with the template. In other examples, these template management interfaces allow an external entity to indicate the type of configuration information that will be stored in a template by allowing the external entity to select individual name-value pair elements of configuration information, i.e. without requiring the user to select a group of configuration information that corresponds to a particular object class. Thus these exemplary template interfaces provide a wide degree of flexibility in establishing the type of configuration information each template holds.

Continuing these examples, the template management interfaces also include elements configured to receive values to record within each element of configuration information held within a template. Upon receiving these values, the template management interfaces can store the values within the templates in local storage, such as the memory 304 or the storage 310. The template management interfaces may employ a wide variety of interface metaphors, elements and technologies known in the art and examples are not limited to any particular approach.

In other examples, the lighting system controller 218 has elements configured to provide one or more association interfaces. Association interfaces can be executed to receive, create, store and delete associations between templates and managed elements, such as the lighting controllers 206 and 208 or managed elements included within the lighting controller 206 and 208. According to these examples, the association interfaces can receive identifiers of associations that are targeted for deletion or modification. In some of these examples, these association interfaces can receive (from an external entity) indications of the associations that information that will be stored in the template (for example, when creating or modifying an association).

In at least one example, the association interface can provide a list of saved templates and a list of managed elements. The list of the managed element may include lighting controllers and may also include managed elements contained within the lighting controllers, such as (potentially multiple) schedules, zones and alarms. Further, in this example, the association interface can accept an indication of one or more listed templates to associate with one or more listed managed elements. After receiving the indication, the association interface can store (in local storage) associations between the saved templates and managed elements as indicated.

According to other examples, the lighting control system includes elements arranged to configure a lighting controller, such as the lighting controllers 206 and 208, with the configuration information. In some examples, the lighting system controller 218 configures the lighting controllers 206 and 208 by providing locally stored configuration information to the lighting controllers 206 and 208 via the network 212. In at least one example, the configuration information is provided to the lighting controllers in the form of one or more templates. According to these examples, the lighting controllers 206 and 208 receive the templates and apply the configuration information included within the templates to one or more objects resident on the lighting controllers 206 and 208. The application of the values included in the configuration information to the objects may involve altering one or more operational parameters. Thereafter, the lighting controllers 206 and 208 may operate according to the values applied to these operation parameters.

In various examples, the elements of lighting controller 218 that are configured to provide configuration information are robust, fault tolerant communication interfaces. In some examples, these communication interfaces can attempt to deploy templates anytime after storing the association between templates and managed elements. Moreover, according to these examples, the lighting controller 218 can track the deployment history of templates to their associated managed elements and attempt to re-deploy templates as necessary.

For instance, according to one example, the lighting system controller 218 includes elements configured to initially attempt to deploy templates immediately after storing an association between the templates and managed elements. According to this example, the lighting system controller 218 is configured to receive deployment results from lighting controllers 206 and 208. The deployment results may indicate whether or not templates sent to the lighting controllers 206 and 208 were successfully deployed. Further, in at least one example, the lighting controller 218 can store the deployment results in a deployment history located within local storage. The information included in the deployment history may include the template that was deployed, the managed element associated with the template and the deployment result (if a deployment has been attempted). In this example, if deployment was not successful due to, for example, a lighting controller being offline, the communication interfaces can monitor the network to determine when the offline lighting controller becomes available online and can deploy the template to the lighting control at that time. In other examples, deployment of templates can be scheduled for a particular point in the future.

The interfaces disclosed herein exchange information with various providers and consumers. These providers and consumers may include any external entity including, among other entities, users and systems. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the lighting control system 200 or unauthorized access to the lighting control system 200.

Configuration Synchronization Processes

Figure 4:
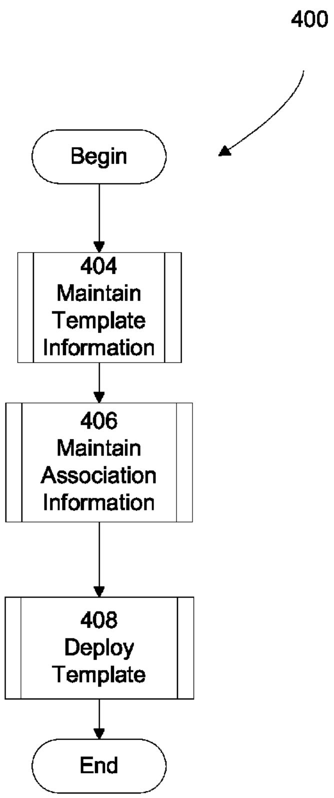
FIG. 4 is a flow chart of an exemplary process for configuring managed elements using one or more templates.

Various examples provide processes for configuring managed elements, such as lighting controllers, using one or more templates. According to some examples, a lighting system controller in accord with the lighting system controllers 218 and 300 discussed above configures managed elements via a network. FIG. 4 illustrates one such process 400 that includes acts of maintaining template information, maintaining association information for the template, and deploying the template to associated lighting controllers.

In act 404, template information is maintained. According to various examples, a lighting system controller maintains the information stored in a template in response to receiving a request to change template information from an external entity and upon receipt of the information required to effect the change. Acts in accord with these examples are discussed below with reference to FIG. 5.

In act 406, a template is associated with one or more managed elements. According to some examples, a lighting system controller stores an association between one or more templates and one or more managed elements upon receipt of a request to perform the association. Acts in accord with these examples are discussed below with reference to FIG. 6.

In act 408, a template is deployed. According to several examples, a lighting system controller deploys the template to managed elements using a network. Acts in accord with these examples are discussed below with reference to FIG. 7.

Automated configuration processes in accord with process 400 decrease the level of effort required to properly maintain lighting control system configurations by allowing external entities to maintain single instances of templates that can be used to configure multiple managed elements. Thus processes like process 400 decrease the total cost associated with operating a lighting control system.

Figure 5:
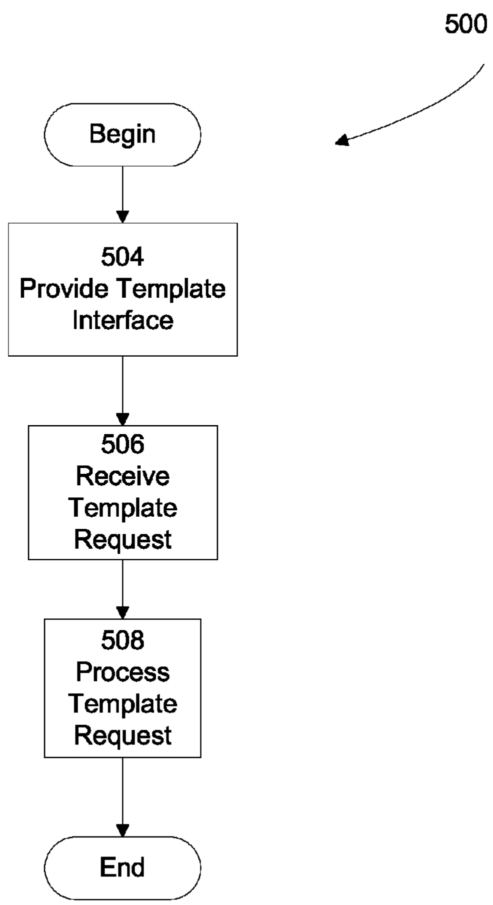
FIG. 5 is a flow chart of an exemplary process for maintaining template information.

As discussed above with regard to act 404 shown in FIG. 4, various examples provide processes for creating templates that contain configuration information that is applicable to multiple managed elements. FIG. 5 illustrates one such process 500 that includes acts of providing a template management interface to an external entity, receiving information required to create a template request from the external entity and processing the template request.

In act 504, a lighting system controller presents a template management interface to an external entity. In some examples, the template management interface provides access to templates that are available in local storage. In these examples, the template management interface also accepts requests to modify the locally stored templates. Additionally, in some examples, the template management interface provides elements through which requests to create new templates and requests to delete stored templates are processed.

In act 506, a lighting system controller receives a request to maintain (create, delete or modify) a template. In some examples, the request to create a template includes a set of configuration information to include in the template. This configuration information may include, for example, both the types and values of configuration information to store in the template. In other examples, the request to modify a template may include an identifier of the template subject to the request as well as information specifying the change requested to the configuration information stored in the template. In various examples, a request to delete a template may include an identifier of the template.

In act 508, a lighting system controller processes a template information maintenance request. In some examples, the lighting system controller changes the template information stored in local storage based on the request type and the information included in the request. Upon completion of processing the maintenance request, the lighting system controller stores the modified template information in local storage or deletes the template in accord with the maintenance request.

Various examples in accord with the process 500 enable lighting system controllers to maintain templates and the configuration information contained therein. Thus, processes like process 500 enable user to maintain common sets of configuration information that may be applied to one or more managed elements.

Figure 6:
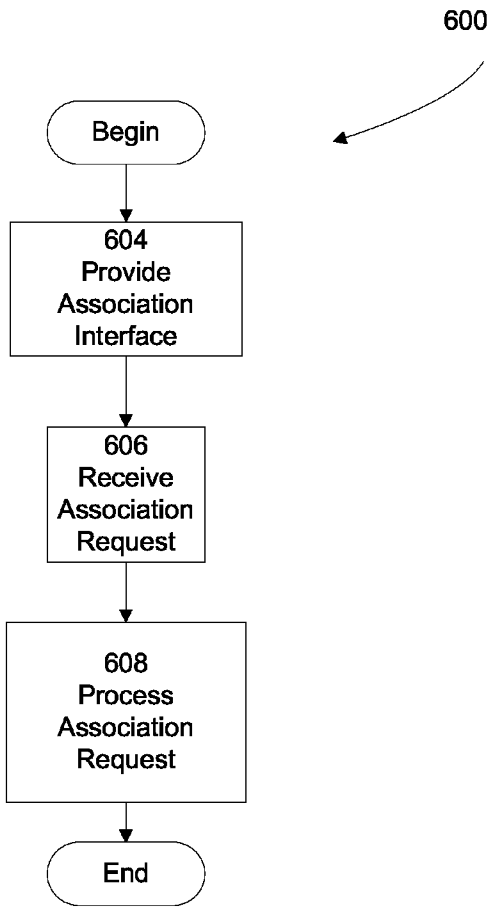
FIG. 6 is a flow chart of an exemplary process for maintaining association information.

As discussed above with regard to act 406 shown in FIG. 4, various examples provide processes for associating templates with one or more managed elements. FIG. 6 illustrates one such process 600 that includes acts of providing an association interface to an external entity, receiving information required to create an association request from the external entity and processing the association request.

In act 604, a lighting system controller presents an association management interface to an external entity. In some examples, the association management interface provides access to associations that are available in local storage. In these examples, the association management interface also accepts requests to modify the locally stored associations. Additionally, in some examples, the association management interface provides elements through which requests to create new associations and requests to delete stored associations are processed.

In act 606, a lighting system controller receives a request to maintain (create, delete or modify) an association. In some examples, the request to create an association includes identifiers for one or more templates and one or more managed elements. In other examples, the request to modify an association may include an identifier of the association subject to the request as well as information specifying the change requested to the association. In various examples, a request to delete an association may include an identifier of the association.

In act 608, a lighting system controller processes an association information maintenance request. In some examples, the lighting system controller changes the association information stored in local storage based on the request type and the information included in the request. Upon completion of processing the maintenance request, the lighting system controller stores the modified association information in local storage or deletes the association in accord with the maintenance request.

Processes in accord with the process 600 allow a lighting system controller to maintain associations between templates and managed elements. As discussed below, in some examples, these associations enable a lighting system controller to determine which templates to apply to various managed elements.

Figure 7:
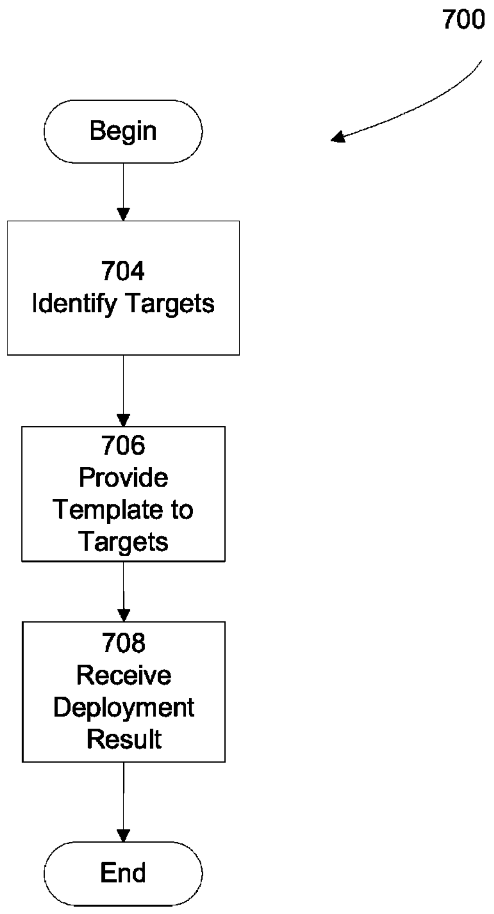
FIG. 7 is a flow chart of an exemplary process for deploying a template.

As discussed above with regard to act 408 shown in FIG. 4, various examples provide processes for a lighting system controller to deploy templates to managed elements. FIG. 7 illustrates one such process 700 that includes acts of identifying managed elements that are associated with templates that have not been successfully deployed, providing the templates to the managed element that are associated with the template and receiving a result from the managed elements that indicates whether the configuration information included in the templates was successfully applied.

In act 704, a lighting system controller identifies managed elements to which an associated template has not successfully been deployed. In some examples, the lighting system controller performs this identification by reading deployment history data from local storage. According to one example, the deployment history data indicates, by template and managed element, whether the previous deployments were successful, unsuccessful and not attempted.

In act 706, a lighting system controller provides the templates identified in act 704 to the lighting controllers including the identified managed elements. In one example, the lighting system controller provides the templates to one or more lighting controllers by transmitting the templates over a network. In act 708, a lighting system controller receives a result of the template deployment from the lighting controller that received the template. In these examples, the result indicates whether or not the lighting controller successfully received and applied the configuration management information included in the template.

Upon completion of process 700, templates stored on the lighting system controller have been deployed to the managed elements with which they are associated. Processes in accord with process 700 allow attributes that are common to multiple managed elements to be configured using a single set of configuration information. Thus processes in accord with process 700 ease the administrative burden associated with configuration management of lighting control systems.

Each of processes 400 through 700 depicts one particular sequence of acts in a particular example. The acts included in each of these processes may be performed by, or using, one or more lighting system controllers as discussed herein. Some acts are optional and, as such, may be omitted in accord with one or more examples. Additionally, the order of acts can be altered, or other acts can be added, without departing from the scope of the apparatus and methods discussed herein. In addition, as discussed above, in at least one example, the acts are performed on a particular, specially configured machine, namely a lighting system controller configured according to the examples disclosed herein.

Lighting Control System with Multiple Object Instances

Figure 8:
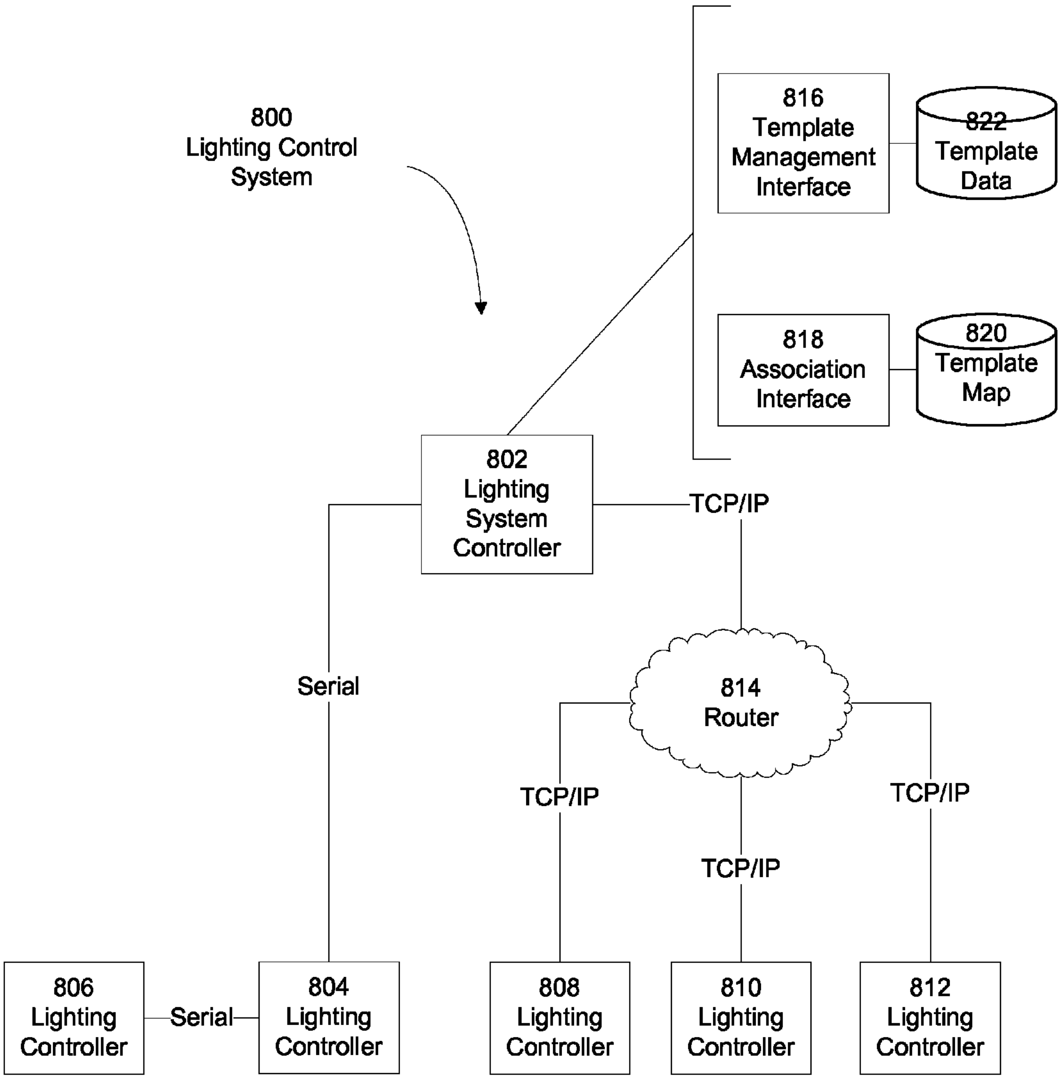
FIG. 8 is a block diagram of another example of a lighting control system.

FIG. 8 illustrates a particular example of the physical and logical elements a lighting control system 800 which includes a lighting system controller 802, lighting controllers 804-812 and router 814. As shown, the lighting system controller 802 includes a template management interface 816, an association interface 818, template map 820 and template data 822. In this illustration, the lighting system controller 802 communicates with the lighting controllers 808-812 using TCP/IP via the router 814. In addition, as depicted, the lighting system controller 802 communicates with the lighting controller 804 via a serial link and with the lighting controller 806 via a serial link between the lighting controllers 804 and 806.

In the example shown, the template interface 816 stores templates in the template data 822 and the association interface 818 stores associations in the template map 820. According to a particular example that may be illustrated with regard to FIG. 8, the template data 822 includes a schedule template that includes schedule configuration information applicable to several different instances of a schedule object. Moreover, according to this example, each of these different instances of the schedule object is resident on different lighting controllers.

Continuing this example, the template map 820 holds associations between the schedule template and each of the instances of the schedule object to which the schedule template is applicable. Table 1 contains the contents of the template map 820 according to this example:

TABLE 1

Example of a Template Map

| Template | Lighting Controller | Object | Instance |
|---|---|---|---|
| Schedule Template | 804 | Schedule Object | 2 |
| Schedule Template | 806 | Schedule Object | 1 |
| Schedule Template | 808 | Schedule Object | 5 |
| Schedule Template | 810 | Schedule Object | 4 |
| Schedule Template | 812 | Schedule Object | 8 |

Thus, according to this example, when deploying the configuration information included in the schedule template, the lighting system controller 802 will deploy the schedule template to each of the lighting controllers 804-812. When lighting controller 804 receives the schedule template, it will apply the configuration information included in the template to the 2nd instance of the schedule object contained in its local storage. When lighting controller 806 receives the schedule template, it will apply the configuration information included in the template to the 1st instance of the schedule object contained in its local storage. When lighting controller 808 receives the schedule template, it will apply the configuration information included in the template to the 5th instance of the schedule object contained in its local storage. When lighting controller 810 receives the schedule template, it will apply the configuration information included in the template to the 4th instance of the schedule object contained in its local storage. Finally, when lighting controller 812 receives the schedule template, it will apply the configuration information included in the template to the 8th instance of the schedule object contained in its local storage.

Having now described some illustrative aspects, it should be apparent to those skilled in the art that the foregoing is merely illustrative and not limiting, having been presented by way of example only. Similarly, aspects may be used to achieve other objectives. Numerous modifications and other illustrative examples are within the scope of one of ordinary skill in the art and are contemplated as falling within the scope of the apparatus and methods disclosed herein. In particular, although many of the examples presented herein involve specific combinations of method acts or system elements, it should be understood that those acts and those elements may be combined in other ways to accomplish the same objectives.

What is claimed is:

1. A method for managing a configuration of a plurality of lighting controllers, the method comprising:

creating a template including a single set of configuration information applicable to operational parameters of each of the plurality of lighting controllers, the single set being sufficient to configure a subset of the operational parameters that are common among each of the plurality of lighting controllers;

associating the template with the plurality of lighting controllers, wherein associating the template includes associating the template with a plurality of objects stored in the plurality of lighting controllers, each of the plurality of objects being stored on a different lighting controller of the plurality of lighting controllers and associating the template with the plurality of objects stored in the plurality of lighting controllers includes associating the template with a plurality of objects having a common class, and wherein some of the plurality of objects have a sequence of instances, each sequence having a number of member instances, each member instance of each sequence having a relative position within each sequence, and wherein associating the template further includes associating the template with a member instance of each sequence, at least two of an associated member instances having different relative positions; and providing the template to each of the plurality of lighting controllers, whereby causing each of the plurality of lighting controllers to apply the configuration information included in the template.

2. The method according to claim 1, wherein creating the template includes receiving configuration information applicable to at least one of an external device input, a zone, a schedule, a clock, an alarm, a control bus and a remote circuit breaker.

3. The method according to claim 1, wherein associating the template includes associating the template with a plurality of configuration elements stored in the plurality of lighting controllers, each of the plurality of configuration elements being stored on a different lighting controller of the plurality of lighting controllers.

4. The method according to claim 1, further comprising receiving a request to create the template from an external entity.

5. The method according to claim 1, further comprising receiving, from each of the plurality of lighting controllers, a deployment result indicating whether the lighting controller sending the deployment result successful applied the template to the operational parameters of the lighting controller.

6. The method according to claim 5, further comprising providing the template to a lighting controller in response to receiving an unsuccessful deployment result from the lighting controller.

7. A lighting system controller comprising:

a network interface;

a memory; and a controller coupled to the network interface and the memory and configured to:

create a template including a single set of configuration information applicable to operational parameters of each of a plurality of lighting controllers, the single set being sufficient to configure a subset of the operational parameters that are common among each of the plurality of lighting controllers;

associate the template with the plurality of lighting controllers by associating the template with a plurality of objects stored in the plurality of lighting controllers, each of the plurality of objects being stored on a different lighting controller of the plurality of lighting controllers, and wherein each of the plurality of objects is based on a common class, and wherein some of the plurality of objects have a sequence of instances, each sequence having a number of member instances, each member instance of each sequence having a relative position within each sequence, and wherein template is further associated with a member instance of each sequence, at least two of an associated member instances having different relative positions; and provide the template to each of the plurality of lighting controllers, whereby causing each of the plurality of lighting controllers to apply the configuration information included in the template.

8. The lighting system controller according to claim 7, wherein the controller configured to create a template is further configured to receiving configuration information applicable to at least one of an external device input, a zone, a schedule, a clock, an alarm, a control bus and a remote circuit breaker.

9. The lighting system controller according to claim 7, wherein the controller configured to associate the template is further configured to associate the template with a plurality of configuration elements stored in the plurality of lighting controllers, each of the plurality of configuration elements being stored on a different lighting controller of the plurality of lighting controllers.

10. The lighting system controller according to claim 7, wherein the controller is further configured to receive a request to create the template from an external entity.

11. The lighting system controller of claim 10, wherein the external entity is at least one of a user and an external system.

12. The lighting system controller according to claim 7, wherein the controller is further configured to receive, from each of the plurality of lighting controllers, a deployment result indicating whether the lighting controller sending the deployment result successful applied the template to the operational parameters of the lighting controller.

13. The lighting system controller according to claim 12, wherein the controller is further configured to provide the template to a lighting controller in response to receiving an unsuccessful deployment result from the lighting controller.

14. A non-transitory computer readable medium having stored thereon sequences of instructions that will cause at least one processor to:

create a template including a single set of configuration information applicable to operational parameters of each of a plurality of lighting controllers, the single set being sufficient to configure a subset of the operational parameters that are common among each of a plurality of lighting controllers;

associate the template with the plurality of lighting controllers by associating the template with a plurality of objects stored in the plurality of lighting controllers, each of the plurality of objects being stored on a different lighting controller of the plurality of lighting controllers, and wherein each of the plurality of objects is based on a common class, and wherein some of the plurality of objects have a sequence of instances, each sequence having a number of member instances, each member instance of each sequence having a relative position within each sequence, and wherein the template is further associated with a member instance of each sequence, at least two of an associated member instances having different relative positions; and provide the template to each of the plurality of lighting controllers, whereby causing each of the plurality of lighting controllers to apply the configuration information included in the template.

15. The non-transitory computer readable medium according to claim 14, wherein the sequence of instructions are further configured to cause the at least one processor to create a template that is configured to receive configuration information applicable to at least one of an external device input, a zone, a schedule, a clock, an alarm, a control bus and a remote circuit breaker.

16. The non-transitory computer readable medium according to claim 14, wherein the sequence of instructions are further configured to cause the at least one processor to associate the template with a plurality of configuration elements stored in the plurality of lighting controllers, each of the plurality of configuration elements being stored on a different lighting controller of the plurality of lighting controllers.

17. The non-transitory computer readable medium according to claim 14, wherein the sequence of instructions are further configured to cause the at least one processor to receive a request to create the template from an external entity.

18. The non-transitory computer readable medium according to claim 17, wherein the external entity is at least one of a user and an external system.

19. The non-transitory computer readable medium according to claim 14, wherein the sequence of instructions are further configured to cause the at least one processor to receive, from each of the plurality of lighting controllers, a deployment result indicating whether the lighting controller sending the deployment result successfully applied the template to the operational parameters of the lighting controller.

20. The non-transitory computer readable medium according to claim 14, wherein the sequence of instructions are further configured to cause the at least one processor to provide the template to a lighting controller in response to receiving an unsuccessful deployment result from the lighting controller.

* * * * *